United States Patent [19]

Ronk

[11] Patent Number: 4,741,084
[45] Date of Patent: May 3, 1988

[54] CONVERSION OF MECHANICAL PUNCH PRESSES TO HYDRAULIC PUNCH PRESSES

[75] Inventor: Leroy B. Ronk, Nokomis, Ill.

[73] Assignee: Ronk Electrical Industries, Inc., Nokomis, Ill.

[21] Appl. No.: 896,519

[22] Filed: Aug. 12, 1986

[51] Int. Cl.$^4$ .................. B21K 21/16; B23D 17/04
[52] U.S. Cl. .................. 29/401.1; 72/453.01; 100/269 R
[58] Field of Search .............. 100/103, 269 R, 269 B, 100/282, 270; 29/560, 401.1; 72/453.03, 453.04, 444

[56] References Cited

U.S. PATENT DOCUMENTS

| | | | |
|---|---|---|---|
| 2,848,034 | 8/1958 | Ernst | 100/269 R |
| 3,143,007 | 8/1964 | Thompson | 72/453.03 |
| 3,552,182 | 1/1971 | Handler | 72/453.03 |
| 3,941,046 | 3/1976 | Smith | 100/269 R |
| 4,148,209 | 4/1979 | Bessho | 72/444 |

FOREIGN PATENT DOCUMENTS 3507327 9/1986 Fed. Rep. of Germany ...... 100/270

*Primary Examiner*—David B. Jones
*Attorney, Agent, or Firm*—Senniger, Powers, Leavitt and Roedel

[57] ABSTRACT

A method of converting a mechanically operated punch press to a hydraulically operated punch press, the mechanical punch press being of the type having a motor-driven flywheel coupled with a crank journaled between two bearing seats, the method comprising disconnecting the flywheel, replacing the crank with a hydraulic ram having trunnions projecting laterally therefrom and sized and positioned to be journaled in the same bearing seats in which the crank was journaled, and connecting the hydraulic ram to a source of hydraulic fluid. A controller can be interposed between the source of hydraulic fluid and the ram to control the operation of the punch press.

3 Claims, 3 Drawing Sheets

CONVERSION OF MECHANICAL PUNCH PRESSES TO HYDRAULIC PUNCH PRESSES

BACKGROUND AND SUMMARY OF THE INVENTION

This invention relates to the conversion of mechanical punch presses to hydraulic punch presses.

Mechanical punch presses powered by flywheels have been used for many years and are still widely used. These presses comprise a frame on which a flywheel is rotatably mounted. The flywheel is usually enclosed in a protective cage and driven by a motor. The frame has two opposing bearing seats in which a crank is journaled. A clutch connects the crank and flywheel to selectively power the crank. The crank drives a punch holder that is slideably mounted between opposing V-shaped guides or gibs.

There is increasing concern about the dangers of flywheel-powered punch presses. The flywheel stores large amounts of energy and would cause serious damage and injury if it broke while running. The protective cages enclosing the flywheel do little more than prevent contact with the moving flywheel, and probably could not contain the flywheel if it broke. Because of this danger, OSHA has required in at least some applications that the flywheel be contained in a pit in the floor. This is a very difficult and expensive conversion, particularly for the smaller shops that are most likely to still be using this type of equipment. Insurance companies have also been pressuring their insureds to eliminate flywheel-powered equipment.

There are numerous other disadvantages with flywheel-powered punch presses. The length of the stroke is generally shorter than, for example, a hydraulic press, and the length or speed of the stroke cannot be controlled. The force applied during the stroke is not uniform. The press wears the punch holder and guides, and is very noisy. It is also difficult and expensive and in some cases impossible to retrofit safety devices such as two-handed controls, "dead-man" switches, or automatic stops.

Among the objects of this invention is to eliminate the danger of flywheel power for punch presses without difficult and costly modifications to the flywheel or complete replacement of the punch press. It is also an object of this invention to increase control over the punching operation, improve safety, reduce operating noise, and extend the life of existing presses presently powered by flywheels. Therefore it is also an object of this invention to provide a simple, inexpensive conversion of a flywheel powered press to a hydraulic powered press using the original equipment as much as possible to contain costs.

The conversion of this invention comprises disengaging the flywheel on the press. The crank is then replaced with a hydraulic ram having trunnions projecting laterally therefrom, the trunnions sized and positioned to be journaled in the same bearings in which the crank was journaled. The ram is then connected to a source of hydraulic fluid, to power the ram and drive the punch holder in the guides. This source can be mounted on the punch press or can be independent from the punch press.

The length of the stroke of the hydraulic ram is generally longer than that provided by the crank, and can be easily controlled. Limit switches can be installed to detect the ram position, and these switches can be connected to a control for controlling the supply of hydraulic fluid in response thereto. The speed and force of the ram, and thus of the punch, can be controlled, unlike when the punch was driven by the flywheel. Because the ram is controllable, safety devices can also be installed on the press including two-handed controls, "dead-man" switches, and stop buttons. Pressure relief valves also protect the press from overloading. The hydraulic ram is much quieter than the flywheel power system, the ram exerts a uniform force over the entire stroke in substantially one direction reducing the wear on the punch holder and guides.

The trunnion mount hydraulic ram can be provided in kit form to facilitate the conversion. A hydraulic pump and means for mounting it to the press frame can be included in the kit. Position sensors, responsive controllers, and mounting means also can be included in the kit.

The conversion of this invention thus eliminates the dangers associated with flywheel power by providing a simple, inexpensive conversion of a mechanical punch press to a hydraulic punch press. The conversion utilizes much of the original press for reduced costs. The conversion increases the control over the punching operation, improves safety, reduces noise, and extends the press life over the flywheel-powered punch presses.

These and other advantages will be more apparent with reference to the detailed description of the preferred embodiment, described below.

BRIEF DESCRIPTION OF THE DRAWINGS

Corresponding reference characters indicate corresponding parts throughout the drawings.

DETAILED DESCRIPTION OF THE PREFERRED EMBODIMENT

Figure 1:
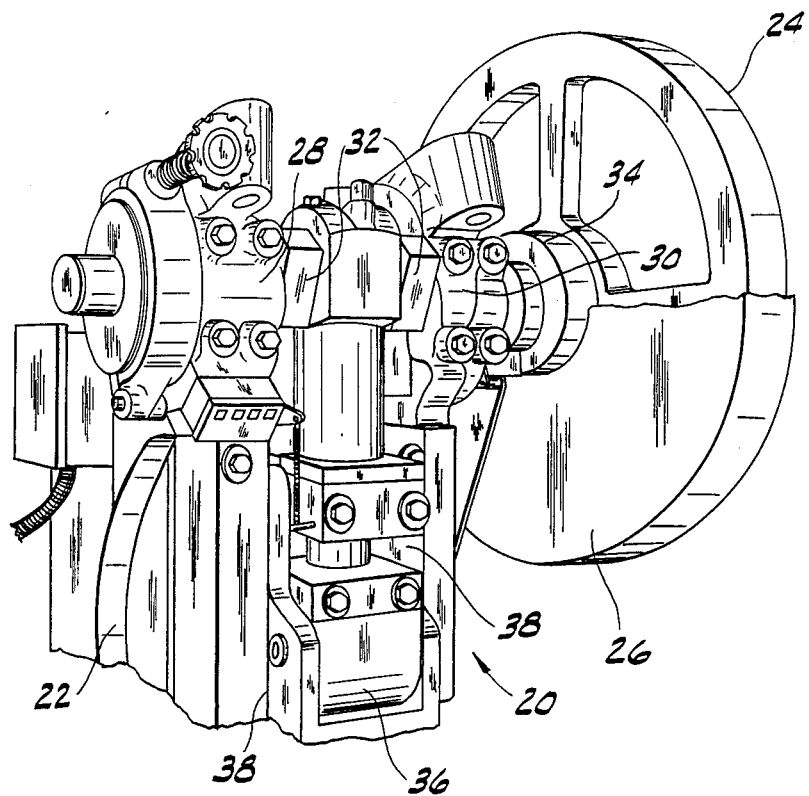
FIG. 1 is a partial front perspective view of a typical prior art flywheel-powered punch press.

A typical prior art flywheel-powered punch press is indicated generally as 20 in FIG. 1. Punch press 20 comprises a frame 22. A flywheel 24 is rotatably mounted on frame 22 and driven by a motor (not shown). Flywheel 24 is enclosed in a protective cage 26. Frame 22 comprises two opposing bearing seats 28 and 30. A crank 32 is journaled in bearing seats 28 and 30. A clutch 34 connects crank 32 and flywheel 24 to selectively power crank 32. Crank 32 drives a punch holder 36 that is slideably mounted between two V-shaped guides or gibs 38.

Figure 2:
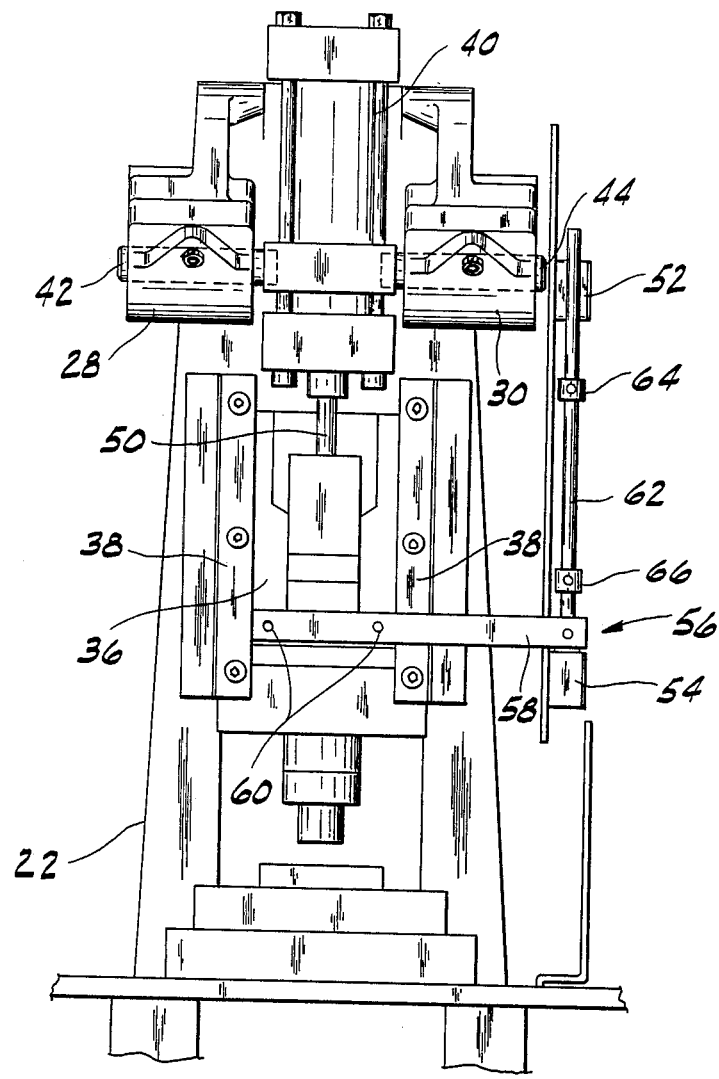
FIG. 2 is a partial front elevation view of the punch press in FIG. 1 after conversion according to the principles of this invention.
Figure 3:
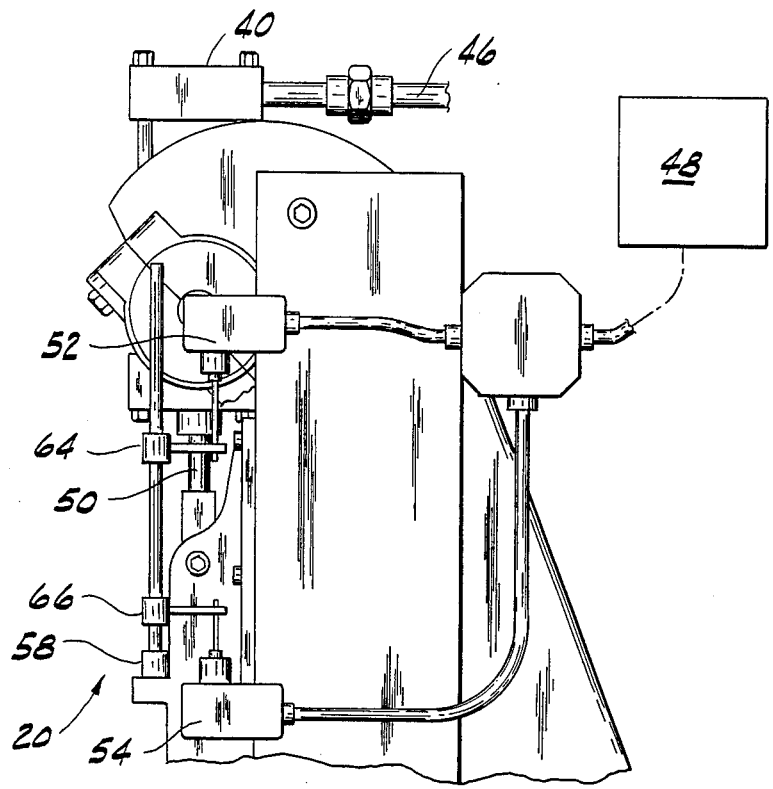
FIG. 3 is a partial right side elevation view of the punch press of FIG. 2, showing the position sensors and controller for controlling the punch stroke.

A modified punch press, after conversion according to the principles of this invention, is indicated as 20' in FIGS. 2 and 3. Flywheel 24 has been disengaged and removed. Crank 32 has also been removed. A hydraulic ram unit 40 having two trunnions 42 and 44 projecting laterally therefrom, is journaled in bearing seats 28 and 30 in place of crank 32. Trunnions 42 and 44 of ram unit 40 are sized and positioned to be received in bearing seats 28 and 30.

Hydraulic ram unit 40 is connected to a source of hydraulic fluid (not shown) by a tube 46. The source of hydraulic fluid may be a pump mounted on frame 22.

Alternatively, the source may be a central source used to operate several items of hydraulic equipment, or a portable source connected to ram unit 40 only when needed. A portable source has the advantage that only one pump need be purchased to operate several different converted punch presses. The source is preferably connected to a control, indicated generally as 48, which may be mounted to frame 22. Control 48 controls the supply of hydraulic fluid to the ram unit 40 and thus can start and stop the ram and can control the speed and force of the ram, as is known in the art.

The ram 50 of frame unit 40 drives punch holder 36 which is slideably mounted between V-shaped guides 38. The ram 50 exerts an uniform force on punch holder 36, parallel to guides 38 so that the punch holder 36 and guides 38 do not wear as much as when the punch press was driven by the flywheel-powered crank which applied a non-uniform force which was not parallel with the guides 38 through the entire stroke.

Upper and lower limit switches 52 and 54 can be mounted on frame 22 of modified punch press 20'. The switches can be operatively connected to control 48 as is known in the art. As is best shown in FIG. 2, a switch trip device 56 is mounted to punch holder 36. Switch trip device 56 comprises a bar 58 mounted to punch holder 36 with screws 60. Bar 58 extends generally laterally from punch holder 36. A guide rod 62 extends vertically upwardly from the end of bar 58. Upper and lower trip members 64 and 66 are adjustably mounted on guide rod 62. Trip members 64 and 66 can be selectively positioned to adjust when they engage fixed limit switches 52 and 54, respectively, and thereby control the upper and lower limits of the movement of punch holder 36. Limit switches 52 and 54 and trip members 64 and 66 thereby detect the position of the punch holder 36.

Safety equipment such as two-handed switches or "dead-man" switches can be easily mounted to frame 22 of modified punch press 20' and connected to control 46. The conversion of this invention eliminates the dangers associated with flywheel power. The resulting modified punch press 20' utilizes much of the original press and thereby achieves in substantial savings. The modified punch press 20' provides improved control over the punching operation, including the length, speed, and pressure of the punch stroke. The modified punch press is also safer, less noisy, and has a longer service life because the ram 50 provides an uniform force on punch holder 36 generally parallel to the guides 38.

A hydraulic ram with trunnions adapted to be mounted in the bearing seats of a punch press can be provided as a kit to facilitate the conversion of this invention. A source of hydraulic fluid, and a control for the source can also be provided in the kit. The kit can also include position sensors, responsive controls, and means for mounting these to the punch press to control the length of the punch stroke. Safety devices, as known in the art, can also be included in this kit for mounting on the punch press and connecting to the control.

There are various changes and modifications which may be made to the invention as would be apparent to those skilled in the art. However, any of these changes or modifications are included in the teachings of this disclosure and it is intended that this invention be limited only by scope of the claims appended hereto.

What is claimed is:

1. A method of converting a mechanically operated punch press to a hydraulically operated punch press, the mechanical punch press being of the type having a motor-driven flywheel coupled with a clutch to a crank journaled between two bearing seats, the method comprising the steps of:
   disconnecting the flywheel;
   replacing the crank with a hydraulic ram having trunnions projecting laterally therefrom, the trunnions sized and positioned to be journaled in the same bearing seats in which the crank was journaled; and,
   connecting the hydraulic ram to a source of hydraulic fluid.

2. The method of claim 1 further comprising the steps of:
   mounting means for detecting the position of the punch to the punch press; and,
   connecting a control responsive to the position detecting means to the source of hydraulic fluid.

3. The method of claim 1 further comprising the steps of:
   mounting a limit switch on the punch press;
   mounting a switch trip on the punch to trip the limit switch when the punch is at a preselected position; and,
   connecting a control responsive to the limit switch to the supply of hydraulic fluid.

* * * * *